United States Patent [19]

Sattlegger et al.

[11] Patent Number: 4,458,055
[45] Date of Patent: Jul. 3, 1984

[54] STORABLE PLASTIC ORGANOPOLYSILOXANE MOLDING COMPOSITIONS

[75] Inventors: Hans Sattlegger, Odenthal; Karl Schnurrbusch; Hans-Gerd Metzinger, both of Leverkusen, all of Fed. Rep. of Germany

[73] Assignee: Bayer Aktiengesellschaft, Leverkusen, Fed. Rep. of Germany

[21] Appl. No.: 360,289

[22] Filed: Mar. 22, 1982

[30] Foreign Application Priority Data

Apr. 11, 1981 [DE] Fed. Rep. of Germany ....... 3114773

[51] Int. Cl.$^3$ .................... C08L 83/06; C08G 77/16; C08G 77/26
[52] U.S. Cl. ...................... 525/477; 528/33; 556/410
[58] Field of Search ............ 525/477; 528/33; 556/410

[56] References Cited

U.S. PATENT DOCUMENTS

| | | | |
|---|---|---|---|
| 3,551,376 | 12/1970 | Seyfried et al. | 525/477 |
| 3,923,736 | 12/1975 | Nitzsche et al. | 525/477 |
| 3,933,729 | 1/1976 | Letoffé | 525/477 |
| 4,267,297 | 5/1981 | Hanada et al. | 525/477 |

FOREIGN PATENT DOCUMENTS

| | | |
|---|---|---|
| 1694209 | 4/1971 | Fed. Rep. of Germany . |
| 1594476 | 7/1970 | France . |
| 0735595 | 5/1980 | U.S.S.R. ............... 556/410 |

*Primary Examiner*—Wilbert J. Briggs, Sr.
*Attorney, Agent, or Firm*—Sprung, Horn, Kramer & Woods

[57] ABSTRACT

A process for the preparation of a plastic organopolysiloxane composition which can be stored in the absence of water and which is convertible even at room temperature into rubber-elastic compositions by the action of water or atmospheric moisture, comprising mixing a hydroxyl-terminated poly-diorganopolysiloxane with about 0.1–15% by weight of the total mixture of a substance of the formula

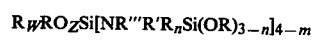

wherein
R is an alkyl radical having 1–4 C atoms,
R' is a divalent alkylene radical having 1–6 C atoms or a unit of the formula —(CH$_2$)$_3$NH(CH$_2$)$_2$— or —(CH$_2$)$_2$—NH(CH$_2$)$_2$NH(CH$_2$)$_2$—,
R''' is an alkyl radical having 1–4 C atoms, R$_W$RO$_2$Si or hydrogen,
n is 0, 1 or 2, and
m = W + Z = 0, 1, 2 or 3, or a partial hydrolysis product thereof as a crosslinking agent.

7 Claims, No Drawings

STORABLE PLASTIC ORGANOPOLYSILOXANE MOLDING COMPOSITIONS

The invention relates to plastically deformable mixtures of organopolysiloxanes with new crosslinking agents, which are converted to a rubber-elastic state at temperatures below 50° C. in the presence of water or water vapor.

Mixtures of this type—also called RTV one-component compositions—are predominantly used as joint-filling compositions and sealant compositions in the building sector, in sanitary installations, in aquarium construction and in industry. They all contain, as basic constituent, an α,ω-dihydroxypolydiorganosiloxane which is optionally mixed with a filler. If this was mixed with a silicon compound which contains more than two reactive groups and with water, and if moisture is excluded from this mixture, reaction mixtures result which are stable to storage and which, when atmospheric air is admitted, is converted into an elastomeric crosslinked product by the water vapor content of the air. RTV one-component systems of this type have been in themselves known for a long time (see, for example, W. Noll, Chemie und Technologie der Silicone (Chemistry and Technology of Silicones), 1968, page 341).

The current commercial compositions have the disadvantage that they split off acetic acid, amines or oximes on crosslinking with moisture, and thereby can lead to a considerable odor annoyance, particularly in the case of processing in closed rooms.

The object of the present invention was therefore to make available organopolysiloxane compositions, in the form of a customary one-component system, which does not have the disadvantages mentioned and which, in addition, is suitable for providing transparent compositions with a neutral odor, which are both stable to storage and exhibit good adhesion and substrates.

The present invention therefore relates to plastic organopolysiloxane molding compositions which can be stored in the absence of water and which are converted even at room temperature, by the action of water or atmospheric air, into rubber-elastic shaped articles or coatings, obtainable by mixing hydroxyl-terminated polydiorganopolysiloxanes with plasticizers, fillers, if appropriate adhesion-promoters, solvents and pigments and with heavy metal salts known to accelerate crosslinking, which are characterized in that the mixture contains, as the crosslinking agent, 0.1 to 15% by weight—relative to the total mixture—of the following substances or their products of partial hydrolysis:

$$R_WRO_ZSi[NR'''R'R_nSi(OR)_{3-n}]_{4-m}$$

wherein
R can be an alkyl radical having 1-4 C atoms, such as $CH_3—$ or $C_2H_5—$,
R' can be an alkylene radical, such as $—CH_2—$, preferably $—(CH_2)_3—$, or even a chain which is longer and has a different structure, such as, for example,
$—(CH_2)_3NH(CH_2)_2—$ or
$—(CH_2)_3NH(CH_2)_2NH(CH_2)_2—$,
R''' can be an alkyl radical having 1-4 C atoms, $R_WRO_2Si$ or H,
n=0, 1 or 2, and
m=W+Z=0, 1, 2 or 3 (for m=1, W or Z=1) (for m=0, W and Z=0),
$C_2H_5O—$ being preferably used as RO. The content of the crosslinking agent is between 0.1 and 15%, preferably 3-8% by weight. The effect according to the invention is not affected, regardless of whether this substance is used as such or is formed in situ, for example by the following reaction:

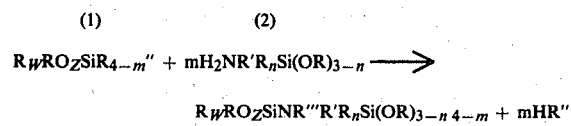

In this reaction, an excess of (1) or of (2) may well be present in the final composition to be used, if, for example, R'' is a substitutent which does not affect the transparency—if desired—of the substance according to the invention, such as, for example, R''=propionic acid amide or caprolactam.

The substances employed according to the invention are prepared from the aminoalkylalkoxysilane by reaction with a reactive alkyl-alkoxychlorosilane or another reactive silane. In this process, the reaction proceeds spontaneously at room temperature, for example as in the case of the reaction of methylalkoxydi-N-methylpropionamidosilane with γ-aminopropyltrialkoxysilane, or requires time as well as the effect of temperature (for example 10 hours at 100° C.), as in the case of the reaction of methylalkoxydi-N-methylpropionamidosilane with γ-N-methylaminopropyltrialkoxysilane. Corresponding to the formula on page 2, the following substances acting according to the invention, inter alia, could be prepared and could be processed, according to the examples, to give one-component compositions. Some of these substances are summarized in the list which follows:

$CH_3Si[NH(CH_2)_3Si(OCH_3)_3]_3$,
$CH_3Si[NH(CH_2)_2NH(CH_2)_3Si(OCH_3)_3]_3$,
$CH_3Si[NH(CH_2)_2NH(CH_2)_2NH(CH_2)_3Si(OCH_3)_3]_3$,
$CH_3(CH_3O)Si[NH(CH_2)_3Si(OCH_3)_3]_2$,
$CH_3(CH_3O)Si[NH(CH_2)_2NH(CH_2)_3Si(OCH_3)_3]_2$,
$CH_3(CH_3O)Si[NH(CH_2)_2NH(CH_2)_2NH(CH_2)_3Si(OCH_3)_3]_2$,
$CH_3Si[NH(CH_2)_3Si(OC_2H_5)_3]_3$,
$CH_3Si[NH(CH_2)_2NH(CH_2)_3Si(OC_2H_5)_3]_3$,
$CH_3Si[NH(CH_2)_2NH(CH_2)_2NH(CH_2)_3Si(OC_2H_5)_3]_3$,
$CH_3(CH_3O)Si[NH(CH_2)_3Si(OC_2H_5)_3]_2$,
$CH_3(CH_3O)Si[NH(CH_2)_2NH(CH_2)_3(OC_2H_5)_3]_2$,
$CH_3(CH_3O)Si[NH(CH_2)_2NH(CH_2)_2NH(CH_2)_3Si(OC_2H_5)_3]_2$,
$CH_3(C_2H_5O)Si[NH(CH_2)_3Si(OC_2H_5)_3]_2$,
$CH_3(C_2H_5O)Si[NH(CH_2)_2NH(CH_2)_3Si(OC_2H_5)_3]_2$,
$CH_3(C_2H_5O)Si[NH(CH_2)_2NH(CH_2)_2NH(CH_2)_3Si(OC_2H_5)_3]_2$,
$CH_3(C_3H_7O)Si[NH(CH_2)_3Si(OCH_3)_3]_2$,
$CH_3(C_3H_7O)Si[NH(CH_2)_2NH(CH_2)_3Si(OCH_3)_3]_2$,
$CH_3(C_3H_7O)Si[NH(CH_2)_2NH(CH_2)_2NH(CH_2)_3Si(OCH_3)_3]_2$,
$CH_3(C_2H_5O)Si[NH(CH_2)_3Si(OCH_3)_3]_2$,
$CH_3(C_2H_5O)Si[NH(CH_2)_2NH(CH_2)_3Si(OCH_3)_3]_2$,
$CH_3(C_2H_5O)Si[NH(CH_2)_2NH(CH_2)_2NH(CH_2)_3Si(OCH_3)_3]_2$,
$CH_3(CH_3O)_2Si[NH(CH_2)_3Si(OCH_3)_3]$,
$CH_3(CH_3O)_2Si[NH(CH_2)_2NH(CH_2)_3Si(OCH_3)_3]$,
$CH_3(CH_3O)_2Si[NH(CH_2)_2NH(CH_2)_2NH(CH_2)_3Si(OCH_3)_3]$,
$(CH_3O)(CH_3)_2Si[NH(CH_2)_3Si(OCH_3)_3]$,
$(CH_3O)(CH_3)_2Si[NH(CH_2)_2NH(CH_2)_3Si(OCH_3)_3]$, $(CH_3O)(CH_3)_2Si[NH(CH_2)_2NH(CH_2)_2NH(CH_2)_3Si(OCH_3)_3]$,
$CH_3[(CH_3)_2CHO]_2Si[NH(CH_2)_3Si(OC_2H_5)_3]$,
$CH_3[(CH_3)_2CHO]_2Si[NH(CH_2)_2NH(CH_2)_3Si(OC_2H_5)_3]$,
$CH_3[(CH_3)_2CHO]_2Si[NH(CH_2)_2NH(CH_2)_2NH(CH_2)_3Si(OC_2H_5)_3]$,
$CH_3(C_3H_7O)Si[NH(CH_2)_3Si(OC_2H_5)_3]_2$,
$CH_3(C_3H_7O)Si[NH(CH_2)_2NH(CH_2)_3Si(OC_2H_5)_3]_2$,
$CH_3(C_3H_7O)Si[NH(CH_2)_2Si(CH_2)_2NH(CH_2)_3Si(OC_2H_5)_3]_2$,
$CH_3(C_2H_5O)_2Si[NH(CH_2)_3Si(OCH_3)_3]$,
$CH_3(C_2H_5O)_2Si[NH(CH_2)_2NH(CH_2)_3Si(OCH_3)_3]$,
$CH_3(C_2H_5O)_2Si[NH(CH_2)_3Si(OC_2H_5)_3]$,
$CH_3(C_2H_5O)Si[NCH_3(CH_2)_3Si(OCH_3)_3]_2$,
$CH_3(C_2H_5O)Si[NCH_3(CH_2)_3Si(OC_2H_5)_3]_2$,
$CH_3(CH_3O)Si[NCH_3(CH_2)_3Si(OCH_3)_3]_2$,
$(CH_3)_2Si[NH(CH_2)_3Si(OCH_3)_3]_2$,
$(CH_3)_2Si[NH(CH_2)_2NH(CH_2)_3Si(OCH_3)_3]_2$,
$(CH_3)_2Si[NH(CH_2)_2NH(CH_2)_2NH(CH_2)_3Si(OCH_3)_3]_2$,
$(CH_3)_2Si[NH(CH_2)_3Si(OC_2H_5)_3]_2$,
$(CH_3)_2Si[NH(CH_2)_2NH(CH_2)_3Si(OC_2H_5)_3]_2$,
$(CH_3)_2Si[NH(CH_2)_2NH(CH_2)_2NH(CH_2)_3Si(OC_2H_5)_3]_2$.

The proportions of the components of the mixture are analogous to those of the known compositions. A preferred mixture contains, per 100 parts by weight of $\alpha,\omega$-dihydroxypolydiorganosiloxane of 500 to 500,000 cP, particularly 10,000 to 60,000 cP viscosity at 20° C., 10 to 150 parts by weight of a filler, 0.1 to 15 parts by weight of the crosslinking agent, or if appropriate a crosslinking agent mixture which contains at least 1% of the crosslinking agent defined above, and, if appropriate, 0.1 to 3.0 parts by weight of a heavy metal compound as the catalyst.

The following components can also be concomitantly used as components of the mixture if appropriate: adhesion-promoters, such as, for example, alkoxysilanes, aminoalkylalkoxysilanes or compounds of the type $R_3SiO[SiR_2O]_n$-$SiR_3$ (R=alkyl radical having 1–4 C atoms, n=0–10), and solvents of an aromatic nature as well as of an aliphatic, straight-chain and branched nature.

Reinforcing fillers, such as colloidally dispersed silicic acid, are preferred, but fillers with little reinforcing action, such as quartz flour, diatomaceous earth or zinc oxide and chalk, can also be used for this purpose. In addition, fillers of this type can be added before use, during or after the incorporation.

The one-component systems according to the invention are suitable, in principle, for all purposes of application. Systems of this type are particularly preferred for pointing in closed rooms and in the do-it-yourself sector.

The preparation of the molding compositions according to the invention from their components of the mixture is effected in a known manner, the largely anhydrous non-crosslinking components being customarily first mixed together, the crosslinking agent thereafter being added and, finally, the total mixture being degassed at room temperature.

The examples which follow are intended to illustrate the present invention in still greater detail.

EXAMPLE 1

A mixture composed of 60 parts by weight of $\alpha,\omega$-dihydroxypolydimethylsiloxane and 20 parts by weight of $\alpha,\omega$-bis-trimethylsiloxy-polydimethylsiloxane is initially introduced into the reaction vessel. 4 parts by weight of a methyl-ethoxy-di-($\gamma$-aminopropyl-triethoxysilyl)-silane are added, and the mixture is stirred at room temperature for a short time. 8 parts by weight of a finely dispersed silicic acid are now added, and the mixture is stirred in vacuo until it is homogeneous. At the end of this process, 0.4 parts by weight of dibutyl-tin diacetate is added directly or in solution in a solvent (dioxane) and is stirred into the mixture in vacuo for approx. 10 minutes, until the mixture is homogeneous. The composition is now introduced into cartridges or tubes and can be stored, without admission of moisture, for at least half a year without the vulcanizability or the adhesion being adversely affected when the composition is used later.

The product exhibited a substantial improvement with respect to odor, mechanical stability, processability and adhesion, and particularly with respect to the odor and, associated therewith, the processability of the material (no annoyance from acetic acid or amine).

The product exhibited very good adhesion, without an undercoat, on various metals, plastics and wood.

Even after storage in water, a good adhesion, without an undercoat, was found, for example, on aluminum, anodized Al, iron, tin and copper. A good adhesion was also achieved on acrylic glass, polycarbonate and PVC.

EXAMPLE 2

A mixture composed of 60 parts by weight of $\alpha,\omega$-dihydroxypolydimethylsiloxane and 20 parts by weight of $\alpha,\omega$-bis-trimethylsiloxy-polydimethylsiloxane is initially introduced into the reaction vessel. 3 parts by weight of methylethoxy-di-n-propionamidosilane and 3 parts by weight of $\gamma$-amino-propyltriethoxysilane are added at room temperature and the mixture is stirred for a short time. 10 parts by weight of a finely dispersed silicic acid are now added, and the mixture is stirred until it is homogeneous. At the end of this process, 0.3 part by weight of dibutyl-tin diacetate is added directly or in solution in a solvent (toluene) and is stirred into the mixture in vacuo for approx. 10 minutes, until the mixture is homogeneous. The composition is now introduced into cartridges or tubes and can be stored, without admission of moisture, for several months (with appropriately dry silicic acid, well over half a year) without the vulcanizability or the adhesion being adversely affected when the composition is used later.

The product, which is transparent, hardens rapidly, well and uniformly in air, and, in accordance with the invention, does not release any strongly smelling gases in the process. After the composition has completely hardened, it exhibits outstanding adhesion, without an undercoat, even after storage in water, for example on aluminum, anodized Al, iron, tin, copper, many plastics—such as acrylic glass, PVC and polycarbonate—and natural materials, such as wood. It exhibits similar properties to the product prepared under Example 1.

EXAMPLE 3

A mixture composed of 60 parts by weight of $\alpha,\omega$-dihydroxypolydimethylsiloxane and 20 parts by weight of $\alpha,\omega$-bis-trimethylsiloxy-polydimethylsiloxane is initially introduced into the reaction vessel. A mixture which contains 2.5 parts by weight of methylethoxy-di-N-caprolactamsilane and 2.5 parts by weight of -aminopropyltriethoxysilane and which has been stored for 24 hours at 80° C. in the absence of moisture is added and the mixture is stirred for a short time. 10 parts by weight of a finely dispersed silicic acid are now added, and the mixture is stirred until it is homogeneous. At the end of this process, 0.3 part by weight of dibutyl-tin diacetate is added directly or in solution in a solvent (xylene) and is stirred into the mixture in vacuo for approx. 10 minutes, until the mixture is homogeneous. The vulcanizability and the adhesion are not adversely affected when the composition is used later.

The product exhibits properties which are as good as those of the products obtained in Examples 1 and 2.

EXAMPLE 4

A mixture composed of 60 parts by weight of α,ω-dihydroxypolydimethylsiloxane and 20 parts by weight of α,ω-bis-trimethylsiloxy-polydimethylsiloxane is initially introduced into the reaction vessel. A mixture which contains 3 parts by weight of diethylenetriamino-γ-n-propyltrimethoxysilane and 3 parts by weight of methylethoxy-di-n-propionamidosilane and which has been stored for 24 hours at 80° C. in the absence of moisture is added and the mixture is stirred for a short time. It was previously confirmed, by means of a nuclear resonance spectroscopic investigation, that the substance according to the invention was formed, this substance having the following formula:

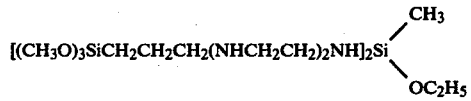

10 parts by weight of a finely dispersed silicic acid are now added, and the mixture is stirred until it is homogeneous. At the end of this process, 0.3 part by weight of dibutyl-tin diacetate is added directly or in solution in a solvent (toluene) and is stirred into the mixture in vacuo for approx. 10 minutes, until the mixture is homogeneous. The composition is now introduced into cartridges or tubes and can be stored, without admission of moisture, for several months without the vulcanizability or the adhesion being adversely affected when the composition is used later. The product exhibits positive properties which are similar to those of the products prepared in Examples 1 and 2.

EXAMPLE 5

A mixture composed of 61 parts by weight of α,ω-dihydroxypolydimethylsiloxane and 20 parts by weight of α,ω-bis-trimethylsiloxy-polydimethylsiloxane is initially introduced into the reaction vessel. 0.5 part of hexamethyldisiloxane, 2 parts by weight of isoeicosane and 5 parts by weight of a methyl-ethoxy-di-(γ-aminopropyl-triethoxy-silyl)-silane are added at room temperature and the mixture is stirred for a short time. 10 parts by weight of a finely dispersed silicic acid are now added, and the mixture is stirred in vacuo until it is homogeneous. At the end of this process, 0.3 part by weight of a catalyst (dibutyl-tin diacetate), dissolved in a solvent (toluene), is added and is stirred into the mixture in vacuo for approx. 10 minutes, until the mixture is homogeneous. The composition is now introduced into cartridges or tubes and can be stored, without admission of moisture, for at least half a year without the vulcanizability or the adhesion being adversely affected when the composition is used later.

The product exhibited a substantial improvement with respect to odor, mechanical stability, processing and adhesion, and particularly with respect to the odor and, associated therewith, the processability of material (no annoyance from acetic acid or amine).

The product according to the invention also exhibited very good adhesion, without an undercoat, on various metals, plastics and wood.

Even after storage in water, a good adhesion, without primer, was found, for example, on aluminum, anodized Al, iron, tin and copper. A good adhesion was also achieved on acrylic glass, polycarbonate and PVC.

EXAMPLE 6

A mixture composed of 60 parts by weight of α,ω-dihydroxypolydimethylsiloxane and 20 parts by weight of α,ω-bis-trimethylsiloxy-polydimethylsiloxane is initially introduced into the reaction vessel. A mixture which contains 3.5 parts by weight of aminoethyl-γ-amino-propyltrimethoxysilane and 4 parts by weight of methyl-ethoxy-di-n-propionamidosilane and which has been stored for 24 hours at 80° C. in the absence of moisture is added and the mixture is stirred for a short time. 10 parts by weight of a finely dispersed silicic acid are now added and the mixture is stirred until it is homogeneous. At the end of this process, 0.3 part by weight of dibutyl-tin diacetate is added directly or in solution in a solvent (xylene) and is stirred into the mixture in vacuo for approx. 10 minutes, until the mixture is homogeneous. The composition is now introduced into cartridges or tubes and can be stored, without admission of moisture, for several months without the vulcanizability or the adhesion being adversely affected when the composition is used later.

The product exhibits properties which are as good as those of the products obtained in Examples 1 and 2.

EXAMPLE 7

A mixture of 60 parts by weight of α,ω-dihydroxypolydimethylsiloxane and 20 parts by weight of α,ω-bis-trimethylsiloxypolydimethylsiloxane is initially introduced into the reaction vessel. 0.5 parts by weight of a methylethoxy-dipropionamide silane are added thereto at room temperature and stirred for a short time. In addition 4 parts by weight of a methylethoxy-di-(γ-aminopropyltriethoxy-silyl)-silane are added at room temperature and again stirred for a short time. Then 8 parts by weight of a finely dispersed silicic acid are added and stirred in vacuo until the mixture is homogeneous. Finally, 0.4 parts by weight of dibutyl-tin diacetate are added directly or dissolved in a solvent (dioxane) and are stirred in for about 10 minutes in vacuo until the mixture is homogeneous. Then the mixture is filled into cartridges or tubes and can be stored for at least ½ year without penetration of moisture, without the vulcanizability or the adhesion in a later application being affected.

The step according to the invention led, with respect to odor, mechanics, processing, cross-linking and adhesion, to an excellent product which also exhibits very good adhesion on various metals, plastics and wood without any undercoat. Even after storage in water good adhesion without any undercoat was able to be determined for example on aluminum, Eloxal, iron, tin and copper. Good adhesion was also achieved on acrylic glass, polycarbonate and PVC.

It will be understood that the specification and examples are illustrative but not limitative of the present invention and that other embodiments within the spirit and scope of the invention will suggest themselves to those skilled in the art.

We claim:

1. A process for the preparation of a plastic organopolysiloxane composition which can be stored in the absence of water and which is convertable even at room temperature into rubber-elastic compositions by the action of water or atmospheric moisture, comprising mixing a hydroxyl-terminated poly-diorganopolysiloxane with about 0.1–15% by weight of the total mixture of a substance of the formula $$R_W(RO)_Z Si[NHR'R_nSi(OR)_{3-n}]_{4-m}$$

wherein
R is an alkyl radical having 1–4 C atoms,
R' is a divalent alkylene radical having 1–6 C atoms or a unit of the formula —(CH$_2$)$_3$NH(CH$_2$)$_2$— or —(CH$_2$)$_2$—NH(CH$_2$)$_2$NH(CH$_2$)$_2$—,
n is 0, 1 or 2, and
m=W+Z=0, 1 or 2,
or a partial hydrolysis product thereof as a cross-linking agent.

2. A process according to claim 1, wherein R is C$_2$H$_5$—.

3. A process according to claim 1, wherein the cross-linking agent is of the formula $$CH_3(C_2H_5O)Si[NHCH_2CH_2CH_2Si(OC_2H_5)_3]_2.$$

4. A process according to claim 1, wherein besides the crosslinking agent according to claim 1 an additional cross-linking agent is used.

5. The product produced by the process of claim 1.

6. The product of claim 5, further containing an α,ω-bis-trimethylsiloxypolydimethylsiloxane.

7. The product of claim 6, wherein the cross-linking agent is of the formula $$CH_3(C_2H_5O)Si[NHCH_2CH_2CH_2Si(OC_2H_5)_3]_2.$$

* * * * *